W. M. WATSON.

Improvement in Furnaces for Annealing Plow-Shares, &c.

No. 5,137. Reissued Nov. 5, 1872.

WITNESSES.

Villette Anderson.

Geo. E. Upham.

INVENTOR.

William M. Watson

Chipman & Osmun Sc

Attys

A.M. PHOTO-LITHOGRAPHIC CO. N.Y. (OSBORNE'S PROCESS.)

UNITED STATES PATENT OFFICE.

WILLIAM MEDD WATSON, OF TONICA, ILLINOIS.

IMPROVEMENT IN FURNACES FOR ANNEALING PLOWSHARES, &c.

Specification forming part of Letters Patent No. 123,528, dated February 6, 1872; reissue No. 5,137, dated November 5, 1872.

*To all whom it may concern:*

Be it known that I, WILLIAM MEDD WATSON, of Tonica, in the county of La Salle and State of Illinois, have invented a new and valuable Improvement in the Process of Tempering Large or Irregularly-Shaped Pieces of Metal; and I do hereby declare that the following is a full, clear, and exact description of the same, reference being had to the annexed drawing making a part of this specification, and to the letters and figures of reference marked thereon.

Figure 1:
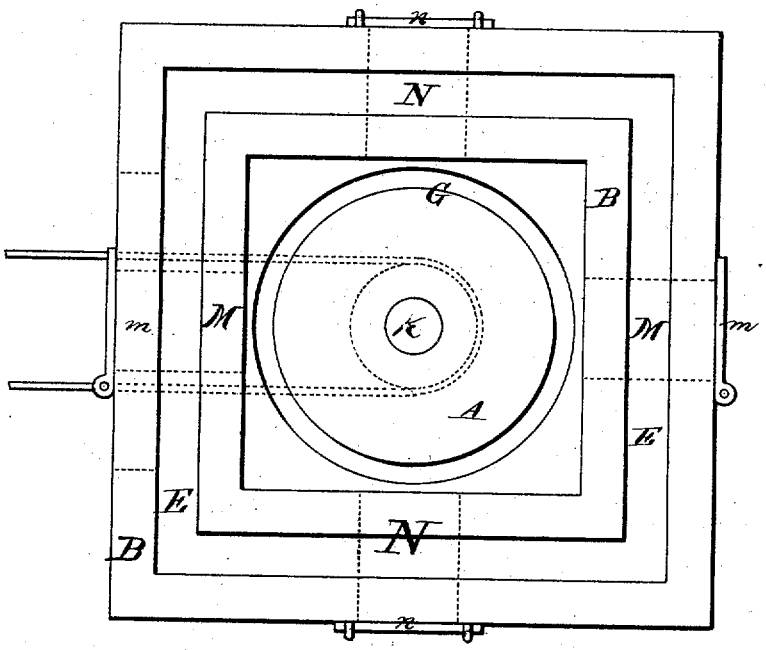
Figure 2:
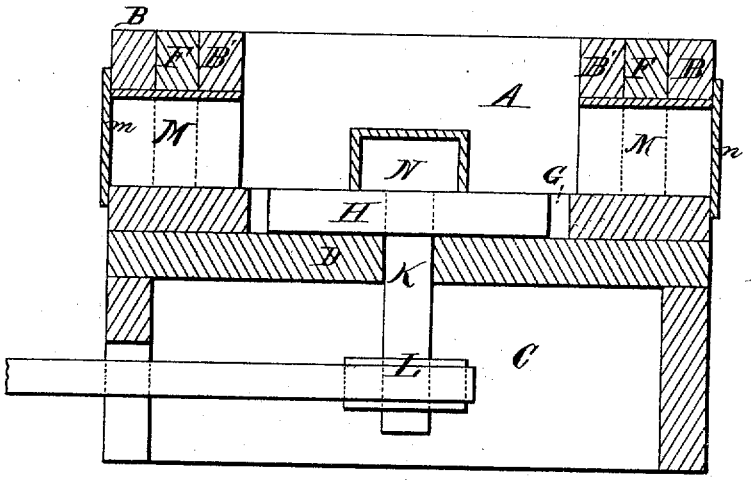

Figure 1 of the drawing is a representation of a tempering-furnace with a rotating platform usually employed by me in tempering such articles. Fig. 2 represents a central vertical section of the same.

My invention has relation to an improvement in the process of tempering plow-plates and other irregular bodies; and it consists in giving to such articles, while in the tempering-furnace, a rapid motion, whereby the heat is uniformly distributed throughout their masses.

In communicating this motion to the articles the means which I prefer are described below.

The letter A of the drawing designates the tempering-oven. This is usually constructed with double walls B B′ on all sides, and is divided from the chamber C below by the horizontal partition or floor D. Between the walls B B′ is a space, E, which is designed to receive a filling, F, of ashes or other non-conducting substance. G represents a recess formed in the floor D of the oven, and designed to receive the rotating hearth H, whose upper surface is preferably made flush with the surface of the floor D. K represents the shaft of the rotating hearth passing vertically down through the oven-floor, and provided at its lower end with a belt-wheel, L, in the chamber C. M M are the hot-draft passages, one of which leads to the smoke-stack and the other to the fire-chamber direct. *m m* represent the dampers which regulate the draft through these passages. N N represent the cold-air passages, and *n n* their regulating-dampers.

Having thus described the different parts of my tempering-oven, I will now explain the mode of operation. It is an exceedingly difficult and delicate matter to heat any large irregular metallic body in a uniform manner, and if this is not done in the tempering operation the metal will be hard in some places and relatively soft in others. Let us suppose that the parts of a plow are to be tempered—that is, the mold-board, share, and land-side. They are placed on the hearth, which is made to revolve, the fire and smoke passages being open and the cold-air passages closed. Thus all sides are brought in contact with the hot draft while in motion, and the effect is usually to bring the different parts to a uniform high temperature. But, should one part become unduly heated, the hot draft from the fire is shut off wholly or partially by closing the damper, and the smoke-passage also closed, while the hearth continues its rapid motion until all the parts are brought to a uniform temperature. If the parts are too hot the side dampers may be opened until their temperature is sufficiently reduced. When the proper degree of heat is attained the pieces should be withdrawn from the oven and cooled in water or some tempering mixture.

The hearth is usually formed of a circular plate of cast-iron, supported on an upright shaft, and provided with a layer of fire-brick on its upper surface of sufficient thickness to hold the heat and prevent warping of the plate. The inner wall B is laid of fire-brick and the outer wall of common brick, the space between being filled with dry ashes, the object of which is to allow the inner brick to expand and contract without danger of cracking the outer wall, and also to hold the heat.

But I do not desire to confine myself, in the application of my process, to any prescribed construction, there being many ways well known to those skilled in the art whereby the proper hot and cold drafts may be applied, and motion given to the articles being heated in the tempering-oven.

What I claim as new, and desire to secure by Letters Patent, is—

1. The process of tempering plowshares and other irregularly-shaped metallic bodies with uniformity, by the means substantially as specified.

2. The combination, with a tempering-oven having suitable openings for hot and cold drafts, of a platform or hearth arranged in direct contact with the fire, capable of being put in motion during the tempering operation, substantially as specified.

In testimony that I claim the above I have hereunto subscribed my name in the presence of two witnesses.

WILLIAM MEDD WATSON.

Attest:
HENRY GUNN,
M. WATSON.